United States Patent [19]

Frankel et al.

[11] 3,832,390

[45] Aug. 27, 1974

[54] ENERGETIC POLYNITRO HALOGENATED DIOL ETHERS

[75] Inventors: Milton B. Frankel, Tarzana; Edward F. Witucki, Sepulveda, both of Calif.

[73] Assignee: Rockwell International Corporation, El Segundo, Calif.

[22] Filed: Nov. 21, 1968

[21] Appl. No.: 779,311

[52] U.S. Cl. ........... 260/487, 260/615 F, 149/19.3, 149/88, 149/92

[51] Int. Cl. ........................ C07c 69/62, C07c 43/12

[58] Field of Search ........... 260/615 F, 487; 149/88

[56] References Cited

UNITED STATES PATENTS

| | | | |
|---|---|---|---|
| 3,356,714 | 12/1967 | Kamlet | 149/88 X |
| 3,387,044 | 6/1968 | Grakauskas et al. | 149/88 X |
| 3,388,147 | 6/1968 | Kamlet et al. | 149/88 X |

*Primary Examiner*—Leland A. Sebastian

*Attorney, Agent, or Firm*—Robert M. Sperry

[57] ABSTRACT

This invention is concerned with novel, monomeric, aliphatic diols of the general formula:

$$FC(NO_2)_2ROCH_2\underset{\displaystyle OH}{\underset{|}{C}}HROH$$

wherein R is a lower alkylene of one to three carbon atoms.

This invention herein described was made in the course of or under a contract or subcontract thereunder, (or grant) with the Department of the Air Force.

4 Claims, 2 Drawing Figures

INVENTORS.
MILTON B. FRANKEL
EDWARD F. WITUCKI

BY

Paul L. Salatino
ATTORNEY

INVENTORS.
MILTON B. FRANKEL
EDWARD F. WITUCKI

BY Paul L. Sabatini
ATTORNEY

ENERGETIC POLYNITRO HALOGENATED DIOL ETHERS

BACKGROUND OF THE INVENTION

This invention relates to novel, energetic compounds. The compounds of the invention are characterized as consisting of an aliphatic, ether chain substituted with nitro radicals, a halogen group and with hydroxy moieties. Generally, the halogen and nitro groups are joined to a common carbon atom positioned on one side of the ether linkage while the hydroxy groups are usually bonded to a different carbon atom wherein said carbon atom is positioned on the other side of the ether linkage.

The novel compounds of this invention are of the formula:

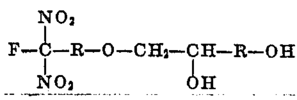

wherein R is the same or different or it is a lower alkylene of one to three carbon atoms such as $-CH_2-$, $-CH_2-CH_2-$,

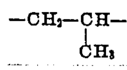

and the like. The alkylene radicals can be further represented by the general formula $C_nH_{2n}$ wherein $n$ is a positive number of 1 to 3 inclusive.

Exemplary of substituted aliphatic ethers within the scope of this invention are

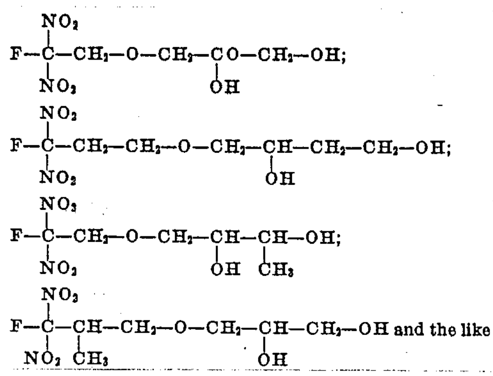

The polynitro aliphatic diols as described supra are an important and novel class of monomers because the diols can be chemically reacted with dicarboxylic acids to form condensation polymers of the polyester type. The polynitro-diols can also be reacted with diisocyanates to form addition polymers of the polyurethane type. The polymers formed from the immediate polymers can be used as castable binders for the formulation of energetic propellant and energetic explosive compositions. The prepolymers are easily cured in the formed propellant or energetic compositions by utilizing conventional curing agents such as hexamethylene diisocyanate, bis-isocyanatophenol methane, toluene diisocyanate, 3-nitraza-1,5-pentane diisocyanate, tris-(methyl aziridinyl)-phosphine oxide, and the like. The polyester prepolymers can be dihydroxy or dicarboxy terminated and the polyurethane prepolymers are generally terminated with dihydroxy or diisocyano groups.

SUMMARY OF THE INVENTION

Briefly, the invention is concerned with novel, energetic compounds of the general formula

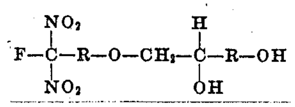

wherein the R's are the same or different and wherein said R is a straight or branched chain alkylene bridge of one to three carbon atoms inclusive.

DESCRIPTION OF THE PREFERRED EMBODIMENTS

Figure 1:
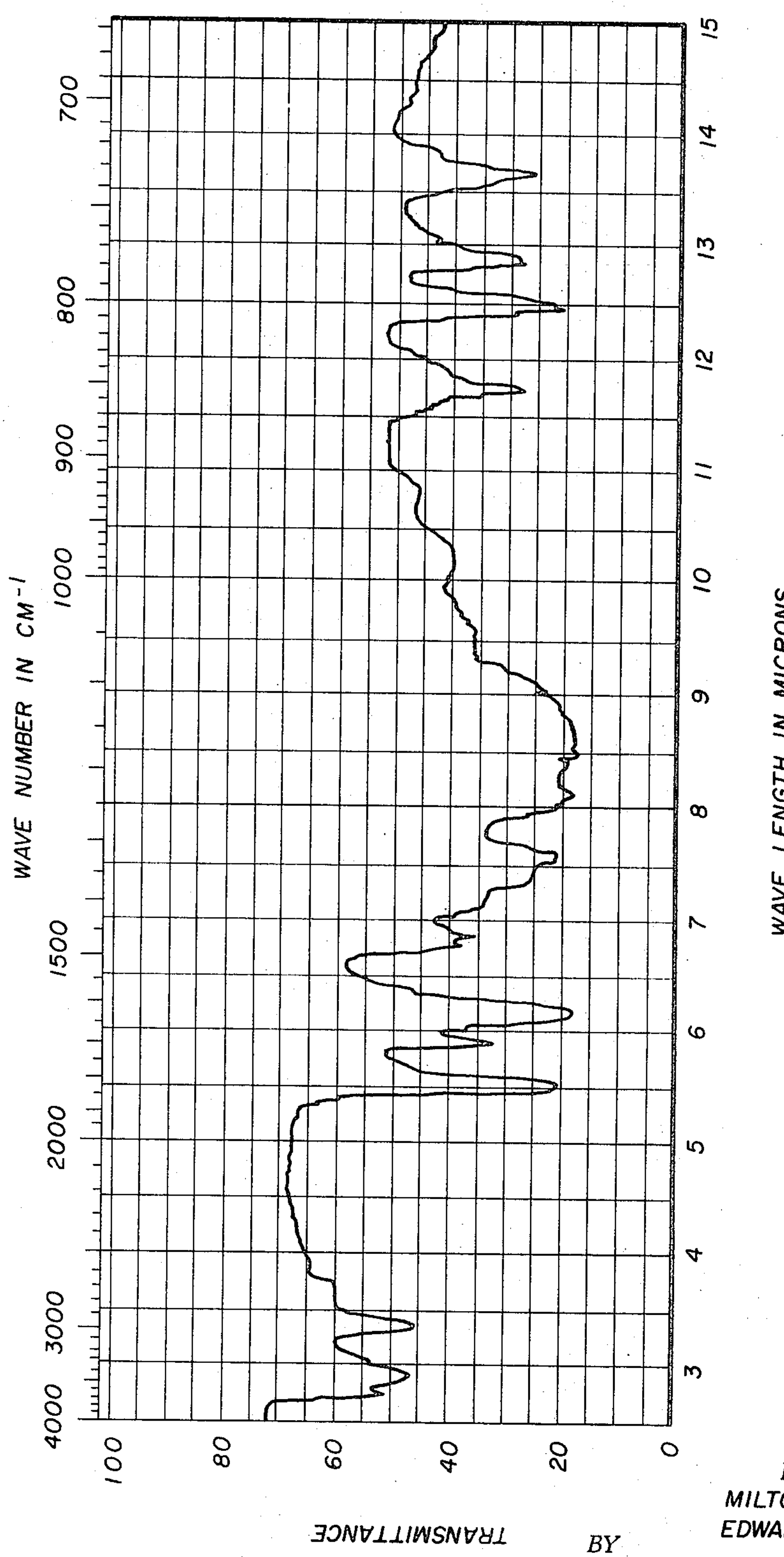

The novel compounds of the subject invention as set forth in the formula can be exemplified by the non-limiting example of an energetic polynitrol diol, such as 3-(2′,2′-dinitro-2′-fluoroethyoxy)-1,2-propanediol. This latter diol finds one utility as a monomer for the preparation of energetic polyester and polyurethane prepolymers. The polynitro diols of the invention possess internal energy which energy is imparted to the compound by the presence of the $FC(NO_2)_2$ moiety. The hydroxyl groups in the compound, generically referred to as diols, are stable and can undergo the usual reactions of an alcohol group in ester and urethane type reactions because these diols are adequately insulated from the highly electronegative $FC(NO_2)_2$ group by the presence of intermediate alkylene moieties in the aliphatic chain and the ether linkage.

The above structure is in contrast to the usual polynitro diols such as 2,2-dinitro-1,3-propanediol wherein the hydroxy or diol groups are positioned alpha to the gem-dinitro group. Thus, in structures of this type the hydroxy groups tend to be very acidic and they do not readily lend themselves to the usual reactions of an alcohol. Another undesirable feature of this type of compound is that the hydroxy-terminated prepolymers are usually unstable and they exhibit a tendency to deformylate on standing under normal atmospheric conditions.

The novel monomeric compounds of the present invention of the general formula

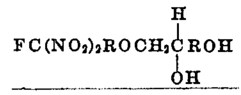

wherein R is described supra, can be prepared by the following procedure: first, an epoxide such as glycidyl-2,2-dinitro-2-fluoroethoxide is converted to hydroxy-trifluoroacetate by a peroxy acid and a catalyst such as peroxytrifluoroacetic acid and triethylammonium trifluoroacetate, respectively. Finally, methanolysis of the intermediate employing a resin, such as Amberlite IR-120, gives the desired resulting glycol. A typical synthesis can be represented by the following general equation:

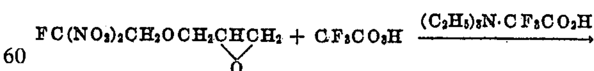

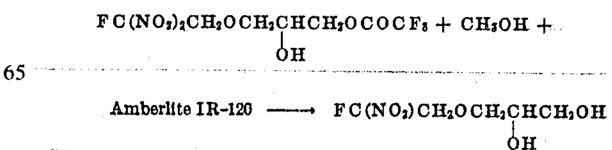

The prior art literature reference upon which the synthesis is based is set forth in Journal of the American Chemical Society, Vol. 76, p. 3472, 1954.

The above discussion is merely illustrative of the mode and manner of carrying out the present invention, and it is to be understood that the discussion is not intended to be limited to the instant disclosure, as other techniques may be successfully employed.

The following examples are representative of embodiments of the present invention and these examples are not to be construed as limited as other obvious embodiments will be readily apparent to those versed in the art.

EXAMPLE I

Preparation of allyl 2,2-dinitroethyl ether: 50 grams (0.264 mole) of 1,2 dichloro-1,1-dinitroethane were added dropwise over a 15 minute period to a well stirred mixture of 200 ml of methylene chloride, 85.5 grams (1.48 moles) of allyl alcohol and 219 grams (1.32 moles) of potassium iodide. The slightly exothermic reaction was controlled at 20–25°C with an ice bath. The resulting red solution was stirred at room temperature for 12 hours. About 200 ml of water was added to dissolve the inorganic salts and the layers were separated. The water layer was extracted with methylene chloride and the combined organic portion was then washed several times with a 10 percent sodium thiosulfate to remove iodine. After a final water wash, the methylene chloride solution was dried over magnesium sulfate. Removal of excess methylene chloride yielded a red oil and a white solid. These materials were separated by crystallization of the solid from carbon tetrachloride. The white solid was found to be 1,2 diiodopropanol and the red oil was crude allyl 2,2-dinitroethyl ether. The crude allyl 2,2-dinitroethyl ether was purified by first forming the potassium salt through reactiion with potassium hydroxide, recrystallization from methanol, and then acidifying to pH of 1 with hydrochloric acid. The resulting pure allyl 2,2-dinitroethyl ether, was obtained in 55 percent overall yield as a colorless oil, $n_D^{27.5}$ 1.4527, $d^{25}$ 1.3. The calculated elemental analysis for $C_5H_8N_2O_5$ was C, 34.09; H, 4.55; N, 15.19. The found analysis was C, 34.20; H, 4.29; N, 16.11. Infrared spectrum for the compound, in Nujol, exhibited maximum peaks at 6.35, 7.5, and 9.0 microns.

EXAMPLE II

Preparation of allyl 2,2-dinitro-2-fluoroethyl ether: The pure allyl 2,2-dinitroethyl ether, prepared according to the procedure set forth in Example I, was added (4.11 grams; 0.0234 moles) slowly to a well stirred solution of sodium hydroxide (0.935 grams; 0.0234 mole) water (15 mls) and methanol (35 mls). The slightly exothermic reaction yielded an immediate orange color; the final pH was approximately 8. Perchloryl fluoride was then metered into the system to which was added a dry ice reflux condenser to prevent excess perchloryl fluoride from sweeping out of the reaction flask. When the perchloryl fluoride began to reflux vigorously, it was shut off and under slight nitrogen flow reflux was maintained for about 4 hours. The reaction temperature was maintained between 20–25°C with a water bath. The reaction mixture had changed from deep orange to pale orange in color. Water (50 mls) was added and a yellow oil dropped out of solution. The mixture was then extracted with 3–60 ml portions of methylene chloride. The methylene chloride extracts were washed with 3–30 ml portions of 3 percent sodium hydroxide and finally with water. After dryings with magnesium sulfate, excess methylene chloride was removed under vacuum and the residual liquid was distilled through a small Vigreux column. The distillation yielded 2.4 grams (53 percent yield) of allyl, 2,2-dinitro-2-fluoroethyl ether b.p. 42°C/1.1 mm, $n_D^{25}$ 1.4240, $d^{25}$ 1.28. The calculated elemental analysis for $C_5H_7N_2O_5$ was C, 30.93; H, 3.64; N, 14.43. The found analysis was C, 30.86; H, 3.45; N, 14.43. The infrared spectrum for the compound, in Nujol, exhibited maximum peaks at 6.2, 7.6 and 9.0 microns.

EXAMPLE III

Preparation of glycidyl 2,2-dinitro-2-fluoroethoxide: A solution of peroxytrifluoroacetic acid was prepared from 0.78 ml (0.028 mole) of 90 percent hydrogen peroxide, 4.73 ml (0.0335 mole) of trifluoroacetic anhydride and 10 ml of methylene chloride. This reagent was added over a 25 minute period to a well stirred boiling mixture of 3.18 g. (0.0164 mole) of allyl 2,2-dinitro-2-fluoroethyl ether, 25 ml methylene chloride, and 12.4 g. (0.088 mole) of disodium hydrogen phosphate (predried in vacuum oven overnight at 50°C). After the mild exothermic reaction had subsided, the solution was heated under reflux for two additional hours. The resulting mixture was stirred with 60 ml of water until all the inorganic salts had dissolved. The organic layer was separated and the aqueous layer was extracted with 3–25 ml portions of methylene chloride. The combined methylene chloride portion was washed with 50 ml of 10 percent sodium bicarbonate and dried over magnesium sulfate. The solvent was removed at reduced pressure and the residual liquid was fractionated through a small Vigreux column to yield 1.99 g. (58 percent yield) of glycidyl 2,2-dinitro-2-fluoroethoxide b.p. 66°C/0.15 mm, $n_D^{28}$ 1.4350, $d^{25}$ 1.45. The calculated elemental analysis for $C_5H_7N_2O_6F$ was C, 28.6; H, 3.36; N, 13.33. The found analysis was C, 28.78; H, 3.29; N, 13.46. The infrared spectrum for the compound, in Nujol, exhibited maximum peaks at 6.25, 7.65, 9.4 and 11.10 microns.

EXAMPLE IV

Preparation of 2-hydroxy-1-trifluoroacetoxy-3-(2',2'-dinitro-2'-fluoroethoxy)-propane: A solution of peroxytrifluoroacetic acid was prepared at 0°C from 0.99 g. (0.0262 mole) of 90 percent hydrogen peroxide, 7 g. (0.0333 mole) of trifluoroacetic anhydride and 20 ml of ethylene dichloride. This reagent was added over a 20 minute period to a well stirred mixture of 5 g. (0.0238 mole) of glycidyl 2,2-dinitro-2-fluoroethoxide, 2.6 g. (0.012 mole) of triethyl ammonium trifluoroacetate and 20 ml of ethylene dichloride. The reaction mixture was held at 0°–5°C during this addition. It was then refluxed for 2 hours. After cooling the mixture was washed well with water and the organic portion dried with calcium sulfate. The solvent was removed under reduced pressure and the residual liquid was distilled through a small molecular still to yield 3.6 g. (47 percent) of 2-hydroxy-1-trifluoroacetoxy-3-(2',2'dinitro-2'-fluoroethoxy) propane, b.p. 112°–115°C/0.025 mm, $n_D^{26.5}$ 1.4082, $d^{25}$ 1.534. The infrared spectrum for the compound exhibited maximum peaks at 5.5, 6.15, 8.1, 8.6 and 12.5 microns, as set forth in FIG. 1. The calculated elemental analysis for $C_7H_8O_8N_2F_4$ was C, 26.0; H, 2.47. The found analysis was C, 26.3; H, 2.48.

EXAMPLE V

Preparation of 3-(2',2'-dinitro-2'-fluoroethoxy)-1,2-propanediol: A mixture of 3.6 g. (0.011 mole) of 2 hydroxy-1-trifluoroacetoxy-3-(2',2'-dinitro-2'-fluoroethoxy) propane, as prepared according to the procedure set forth in Example IV, was added to 30 ml of methanol and 4 g. of dried ion exchange resin Amberlite IR-120 was refluxed for 19 hours. The ion exchange resin was removed by filtration and the filtrate was concentrated under reduced pressure. The resulting solid residue was distilled through a small molecular still to yield 1.09 g. (43.5 percent) of 3-(2',2'-dinitro-2'-fluoroethoxy)1,2-propanediol, b.p. 110°–112°C/0.005 mm, $n_D^{26}$, 1.4575 $d^{25}$ 1.484. The infrared spectrum for the compound exhibited maximum peaks at 2.9, 6.2, 7.6, 8.8 and 12.5 microns, as set forth in FIG. 2. The calculated elemental analysis for $C_5H_9N_2O_7F$ was C, 26.3; H, 3.94; N, 12.25. The found analysis was C, 25.9; H, 3.74; N, 11.7.

The novel compounds of this invention as prepared by the above described processes are thermally stable and very energetic. The energetic compounds can be utilized in admixtures with the energetic compounds like nitroglycerin, pentaerythritol tetranitrate, picric acid and the like.

The novel compounds of this invention can be used to prepare prepolymers that can be used as binders for propellants and explosive compositions and then cured in situ. Exemplary of a prepolymer is the condensation of a dicarboxylic acid with the diol. For example, a specific reaction for the synthesis of an energetic polyester prepolymer is:

$$\mathrm{C(NO_2)_2[CH_2CH_2CO_2H]_2 + FC(NO_2)_2CH_2OCH_2\underset{\displaystyle OH}{\underset{|}{C}}HCH_2OH \longrightarrow}$$

$$\mathrm{HO_2CCH_2CH_2C(NO_2)_2CH_2CH_2[CO_2CH_2\underset{\displaystyle CH_2OCH_2C(NO_2)_2F}{\underset{|}{C}}HO_2CCH_2CH_2C(NO_2)_2CH_2CH_2]_nCO_2H}$$

wherein $n$ is a positive integer from about 4 to 10. In the above equation an excess of the dicarboxylic acid was used to give a dicarbylic-terminated prepolymer. When an excess of the diol is used, the resulting prepolymer is dihydroxy terminated. These prepolymers are easily prepared by conventional methods well known to the art for the synthesis of polyesters. The dinitropimelic acid as set forth in the equation supra was prepared according to the synthesis disclosed in Journal of the American Chemical Society, Vol. 73, p. 749, 1951.

The novel polymers of the invention are ideally suited for casting explosives into items of predetermined and diverse geometric shapes. The polymer can be loaded with a high percentage of oxidizer and fuel and then cast, and finally cured into a tough resilient explosive composition or composite propellant. For example, a castable explosive composition can easily be formulated by intimately blending 80 weight percent of cyclotrimethylene-trinitroamine (HMX), and 20 weight percent of the polyester prepolymer of 3-(2',2'-dinitro-2'-fluoroethoxy)-1,2 propanediol and curing in situ. This castable composition had an explosive force greater than TNT. Another castable composition can be formulated consisting of 80 weight percent HMX, 10 weight percent of the polyester prepolymer of 3-(2'2'-dinitro-2'-fluoroethoxy)-1,2-propanediol and 10 weight percent of a plasticizer such as bis(2,2-dinitro-2-fluoroethyl) formal and curing in situ to give an energetic composition of matter.

The novel prepolymers prepared herein can be cured with conventional curing agents. Generally, up to 5 weight percent of isocyanate type curing agent is employed for curing the dihydroxy-terminated polyester. Such diisocyanates as hexamethylene diisocyanate, bis-isocyanatophenyl methane, toluene diisocyanate, 3-nitraza-1,5-pentane diisocyanate and the like will give a satisfactory cure. For the dicarboxy-terminated polyesters, aziridine type curing agents, such as tris(methyl aziridinyl) phosphine oxide, are used as the curing agent. Energetic nitro plasticizers, when employed, such as the art available bis(2,2-dinitro-2-fluoroethyl)-formal and the like, usually in a concentration of 0 to 40 weight percent, will give acceptable working properties.

Figure 2:
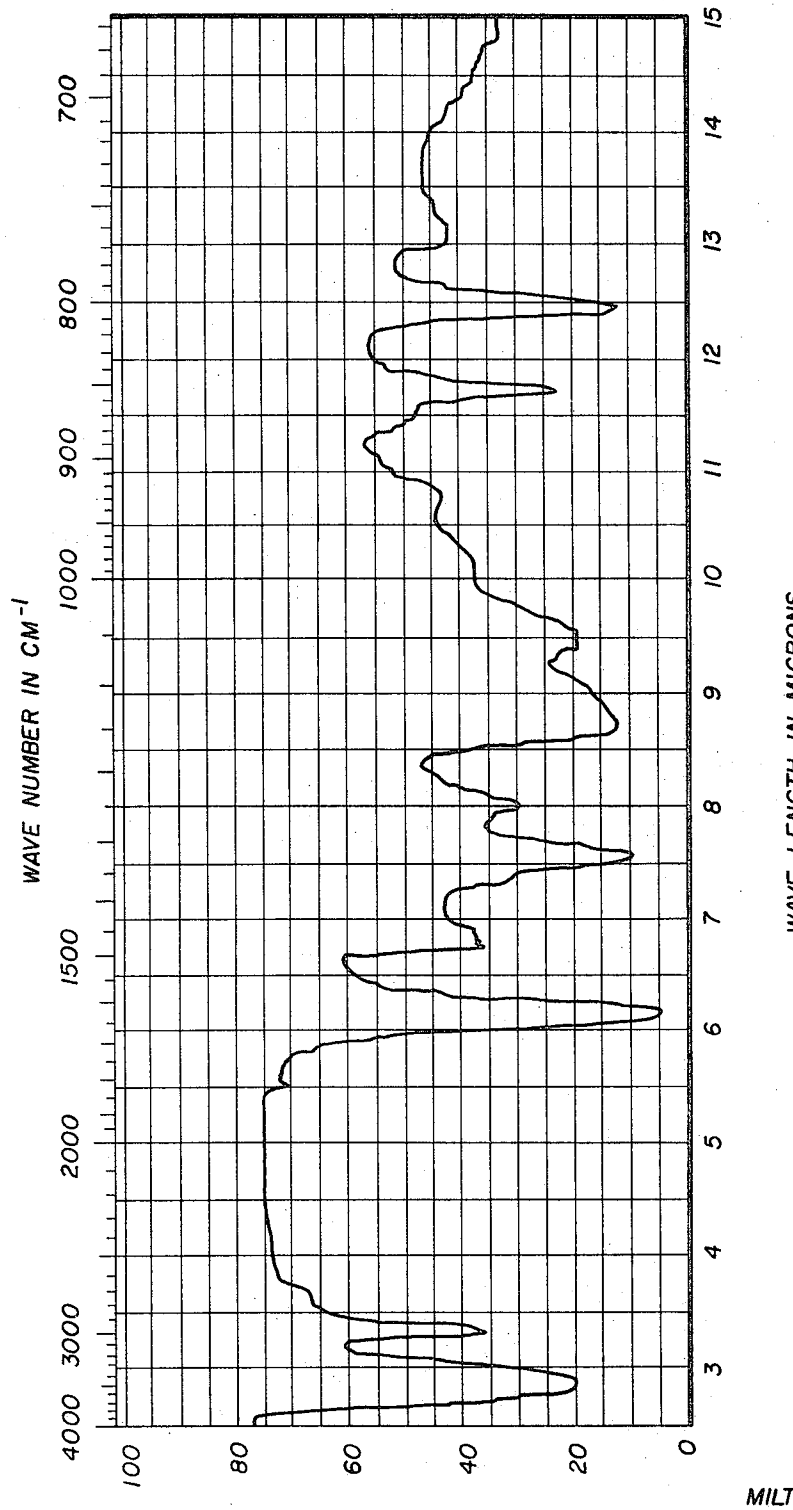

The infrared spectrum for the novel products produced according to the spirit of the invention are set forth in the accompanying figures. FIG. 1 is the spectrum for the novel compound 2-hydroxy-1-trifluoroacetoxy-3-(2',2'dinitro-2'-fluoroethoxy) propane. FIG. 2 is the infrared spectrum for the novel compound 3-(2',2'-dinitro-2'-fluoroethoxy)-1,2-propanediol.

The energetic compounds and composition of matter formed by mixing the compounds with othe explosives can be used for many other endeavors such as oil well shooting, ordnance, demolition, incendiary compositions, rockets, projectiles and the like.

Obviously, many modifications and variations of the instant invention are possible in the light of the above teaching. It is, therefore, to be understood that within the scope of the disclosure and appended claims, the invention may be practiced otherwise than as specifically described.

We claim:

1. A novel energetic compound of the general formula:

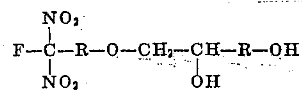

wherein R is an alkylene of one to three carbon atoms.

2. An energetic compound according to claim 1 wherein said R's are methylene.

3. The novel compound 2-hydroxy-1-trifluoroacetoxy-3-(2',2'dinitro-2'-fluoroethoxy)propane.

4. The novel compound 3-(2',2'-dinitro-2'-fluoroethoxy)-1,2-propanediol.

* * * * *